US006764010B2

(12) United States Patent
Collins, Jr. et al.

(10) Patent No.: US 6,764,010 B2
(45) Date of Patent: Jul. 20, 2004

(54) CHECKOUT DEVICE INCLUDING BARCODE READING APPARATUS, SCALE, AND EAS SYSTEM

(75) Inventors: Donald A. Collins, Jr., Atlanta, GA (US); Rex A. Aleshire, Buford, GA (US); Steven J. Hammer, Lilburn, GA (US); Wayne L. Orwig, Dacula, GA (US)

(73) Assignee: NCR Corporation, Dayton, OH (US)

( * ) Notice: Subject to any disclaimer, the term of this patent is extended or adjusted under 35 U.S.C. 154(b) by 127 days.

(21) Appl. No.: 10/143,481

(22) Filed: May 10, 2002

(65) Prior Publication Data

US 2003/0209600 A1 Nov. 13, 2003

(51) Int. Cl.[7] .................................................. G06K 7/10

(52) U.S. Cl. ............................. 235/462.11; 235/462.01; 235/462.25; 235/462.43; 235/383

(58) Field of Search ........................ 235/462.01, 462.25, 235/383, 462.43, 375

(56) References Cited

U.S. PATENT DOCUMENTS 4,141,078 A 2/1979 Bridges, Jr. et al. ........ 364/900
4,575,624 A 3/1986 Klinkhardt .................. 235/449
5,059,951 A 10/1991 Kaltner ....................... 340/572
5,361,158 A * 11/1994 Tang ....................... 235/462.4
5,412,193 A * 5/1995 Swartz et al. ............... 235/383
5,635,906 A * 6/1997 Joseph .................... 340/572.3
5,747,744 A * 5/1998 Kraft et al. .............. 177/25.15
5,936,218 A * 8/1999 Ohkawa et al. ........ 235/462.01
6,154,135 A * 11/2000 Kane et al. .............. 340/572.3
6,237,852 B1 * 5/2001 Svetal et al. ........... 235/462.43
6,497,366 B1 * 12/2002 Burkey et al. ......... 235/462.25
6,598,791 B2 * 7/2003 Bellis et al. ................ 235/383

FOREIGN PATENT DOCUMENTS

WO 8502285 5/1985

* cited by examiner

*Primary Examiner*—Karl D. Frech
*Assistant Examiner*—Ahshik Kim
(74) *Attorney, Agent, or Firm*—Paul W. Martin

(57) ABSTRACT

A checkout device with a barcode reading apparatus, scale, and electronic article surveillance (EAS) system. The checkout device includes a scale including a base portion and a weigh plate over the base portion, a security label deactivation system between the base portion and the weigh plate, and a barcode reading apparatus including a first barcode reader adjacent the scale including a first aperture, and a second barcode reader between the base portion and the weigh plate including a second aperture. The weigh plate includes a third aperture over the second aperture.

3 Claims, 6 Drawing Sheets

CHECKOUT DEVICE INCLUDING BARCODE READING APPARATUS, SCALE, AND EAS SYSTEM

CROSS-REFERENCE TO RELATED APPLICATIONS

The present Application is related to commonly-assigned Application entitled, "CHECKOUT DEVICE INCLUDING INTEGRATED BARCODE READER, SCALE, AND EAS SYSTEM", with Ser. No. 10/061,381, and filing date Feb. 1, 2002.

BACKGROUND OF THE INVENTION

The present invention relates to product checkout devices and more specifically to a checkout device including a barcode reading apparatus, scale, and electronic article surveillance (EAS) system.

Common checkout devices include combinations of barcode readers and scales. One example of such a checkout device is the NCR 7875 checkout device.

Another example of a checkout device includes a barcode reader and an integrated EAS system and is illustrated in U.S. Pat. No. 5,059,951.

It would be desirable to produce a checkout device with a barcode reading apparatus, scale, and EAS system.

SUMMARY OF THE INVENTION

In accordance with the teachings of the present invention, a checkout device including a barcode reading apparatus, scale, and electronic article surveillance (EAS) is provided.

The checkout device includes a scale including a base portion and a weigh plate over the base portion, a security label deactivation system between the base portion and the weigh plate, and a barcode reading apparatus including a first barcode reader adjacent the scale including a first aperture, and a second barcode reader between the base portion and the weigh plate including a second aperture. The weigh plate includes a third aperture over the second aperture.

It is accordingly an object of the present invention to provide a checkout device including a barcode reading apparatus, scale, and an electronic article surveillance (EAS) system.

It is another object of the present invention to provide a method of integrating a barcode reader, scale, and an electronic article surveillance EAS system into a single checkout device.

It is another object of the present invention to provide a method of combining an EAS system into a dual-aperture barcode reader.

It is another object of the present invention to provide a method of combining an EAS system, a scale, and a dual-aperture barcode reader.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
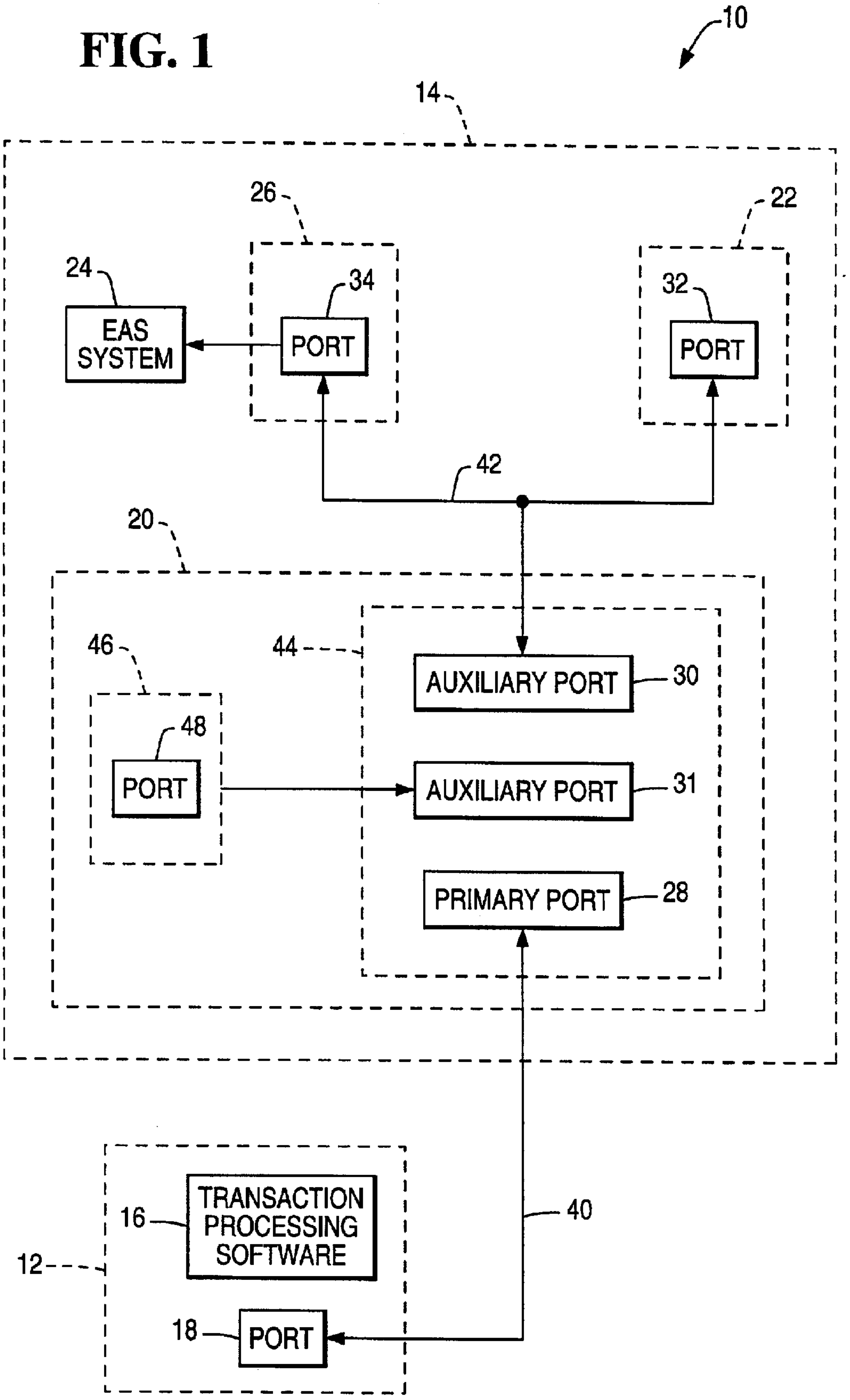
FIG. 1 is a block diagram of a checkout system.

Referring now to FIG. 1, checkout system 10 includes point-of-sale (POS) terminal 12 and checkout device 14.

POS terminal 12 executes transaction processing software 16, which records items for purchase and records payment for the items.

POS terminal 12 additionally includes port 18 to which checkout device 14 is connected. Port 18 may be a serial port, such as an RS232 serial port.

Checkout device 14 primarily includes barcode reader 20, scale 22, and electronic article surveillance (EAS) system 24.

Barcode reading apparatus 20 reads barcode labels on purchased items. Barcode reading apparatus 20 preferably includes vertical barcode reader 44 and horizontal barcode reader 46.

Vertical barcode reader 44 preferably includes primary port 28 for connecting vertical barcode reader 44 to port 18 of POS terminal 12. In addition, vertical barcode reader 44 preferably includes auxiliary port 30 to which other peripherals, such as scale 22 and EAS system 24 are connected, and auxiliary port 31 to which horizontal barcode reader 46 is connected. Ports 28, 30, and 31 may be serial ports, such as RS232 serial ports.

Vertical barcode reader 44 performs its own barcode readings and receives any scale readings from scale 22. Vertical barcode reader 44 receives data from horizontal barcode reader 46 and sends that data along with scale data, and its own barcode data to POS terminal 12. Vertical barcode reader 44 also sends an enable signal to EAS system 24 through interlock 26 following barcode reading.

Vertical barcode reader 44 preferably includes a vertical portion of the NCR 7875 scanner. The vertical portion includes a polygon spinner, mirror basket, detector, and decoding circuitry.

Horizontal barcode reader 46 includes port 48 for sending barcode data to vertical barcode reader 44. Horizontal barcode reader 46 may include an NCR model 7883 barcode reader, which is a self-contained scanner.

It is envisioned under the present invention that the roles of vertical barcode reader 44 and horizontal barcode reader 46 may be reversed. Thus, after role reversal, horizontal barcode reader 46 would have ports 28, 30, and 31, and send the enable signal to interlock 26 and the barcode data to POS terminal 12. Other ways of sharing functions are also envisioned.

Figure 2:
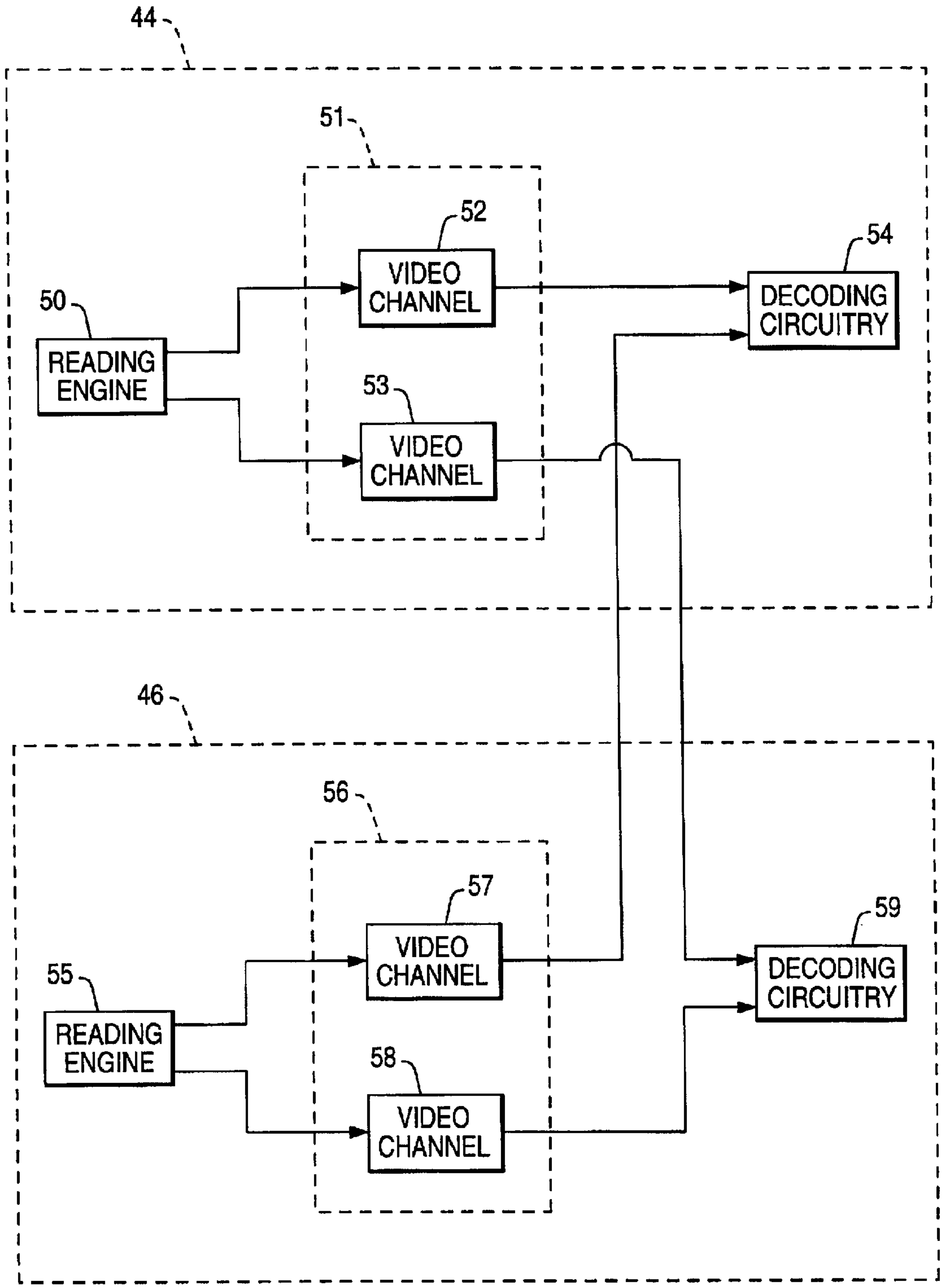
FIG. 2 is a block diagram of barcode reading circuitry in a checkout device.

With reference to FIG. 2, it is further envisioned that vertical barcode reader 44 may optionally decode raw barcode video information from horizontal barcode reader 46 and horizontal barcode reader 46 may decode raw barcode video information from vertical barcode reader 44 in order to enhance performance. Thus, each of barcode readers 44 and 46 may read a barcode label presented to either or both windows.

Vertical barcode reader 44 includes reading engine 50, video circuitry 51, and decoding circuitry 54. Horizontal barcode reader 46 includes reading engine 55, video circuitry 56, and decoding circuitry 59.

Reading engines 50 and 55 may include optical barcode reading engines. An example optical barcode reading engine includes a laser diode, a mirrored polygon spinner, a mirror basket, and a detector. Horizontal and vertical barcode readers 46 and 44 may include more than one reading engine.

Video circuitry 51 and 56 processes signals from detectors in reading engines 50 and 55. Video circuitry 51 includes video channels 52 and 53. Video circuitry 56 includes video channels 57 and 58. Video circuitry 51 and 56 may also include additional video channels.

Decoding circuitry 54 and 59 decode signals from video circuitry 51 and 56 in order to obtain information within barcode labels. Decoding circuitry 51 decodes signals from video channels 52 and 57. Decoding circuitry 56 decodes signals from video channels 53 and 58 and forwards the decoded information to vertical barcode reader 44 through ports 48 and 31.

Returning to FIG. 1, scale 22 weighs purchased produce items. Scale 22 may include a Mettler Toledo model MT8217AS scale.

EAS system 24 deactivates security labels on purchased items that have them. EAS system 24 senses the presence of a security label and deactivates the security label. EAS system 24 is connected to auxiliary port 30 or to interlock 26. Interlock 26 activates EAS system 24 in response to an enable system from vertical barcode reader 44. Thus, interlock 26 signals EAS system 24 to detect a security label only if vertical barcode reader 44 has read a barcode label.

POS terminal 12 and checkout device 14 may be coupled in various ways. As illustrated, cable 40 couples port 18 of POS terminal 12 to primary port 28 of vertical barcode reader 44. Cable 42 couples auxiliary port 30 of vertical barcode reader 44 to port 32 of scale 22 and port 34 of interlock 26.

Under this example, cables 40 and 42 supply data. Cable 42 may additionally supply power to scale 22 from vertical barcode reader 44.

Multiple power connections supply power. POS terminal 12 and horizontal and vertical barcode readers 46 and 44 have their own power connections, or may have one power connection. Interlock 26 and EAS system 24 may share another power connection.

Figure 3:
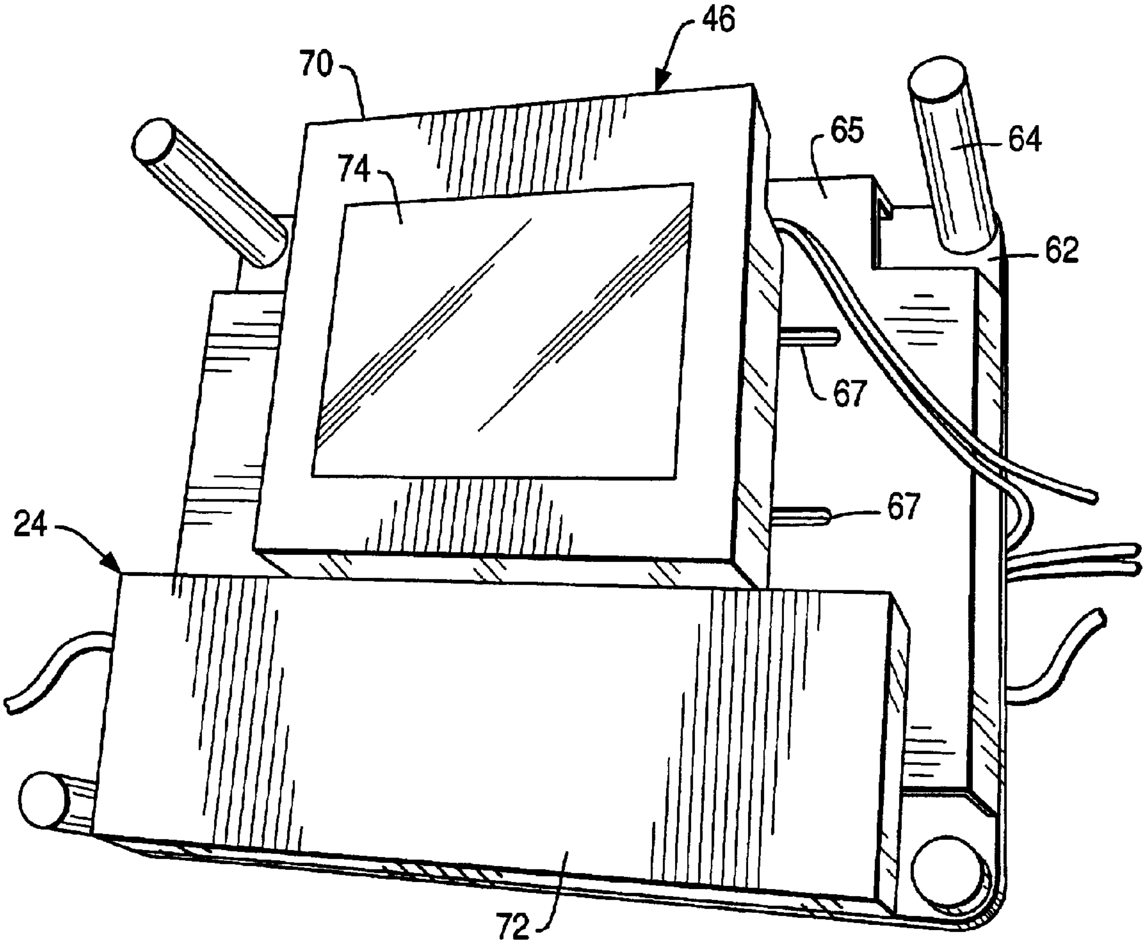
FIG. 3 is a perspective view of an interior assembly within the checkout device.

Turning now to FIG. 3, an example combination of scale 22 and EAS system 24 is shown in detail.

Scale 22 includes base portion 62, and weigh plate support posts 64. Horizontal barcode reader 46 and EAS system 24 are mounted on base portion 62. Weigh plate supports 64 float on a load cell assembly within base portion 62.

Figure 4:
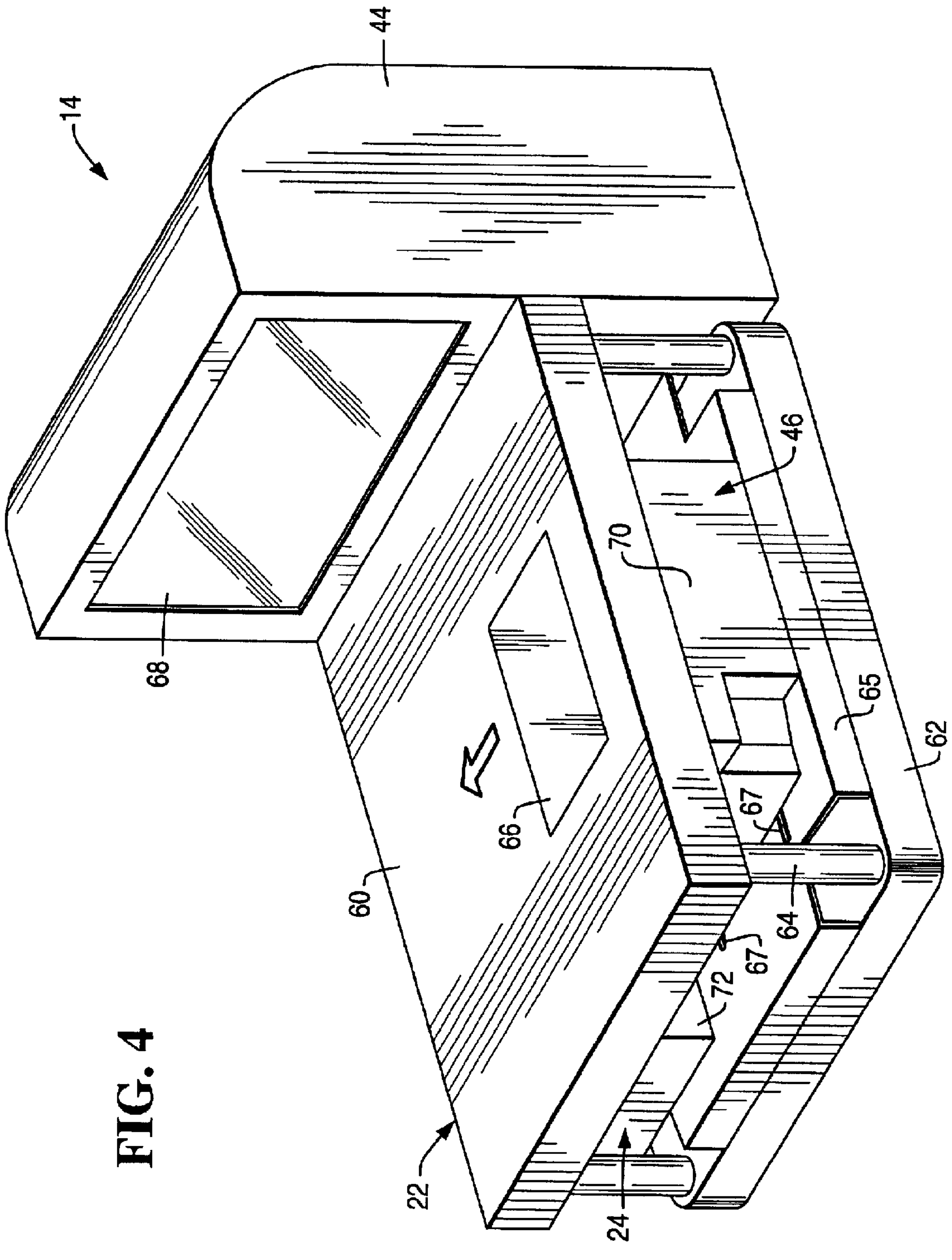
FIG. 4 is a exterior perspective view of a first embodiment of a checkout device.
Figure 5:
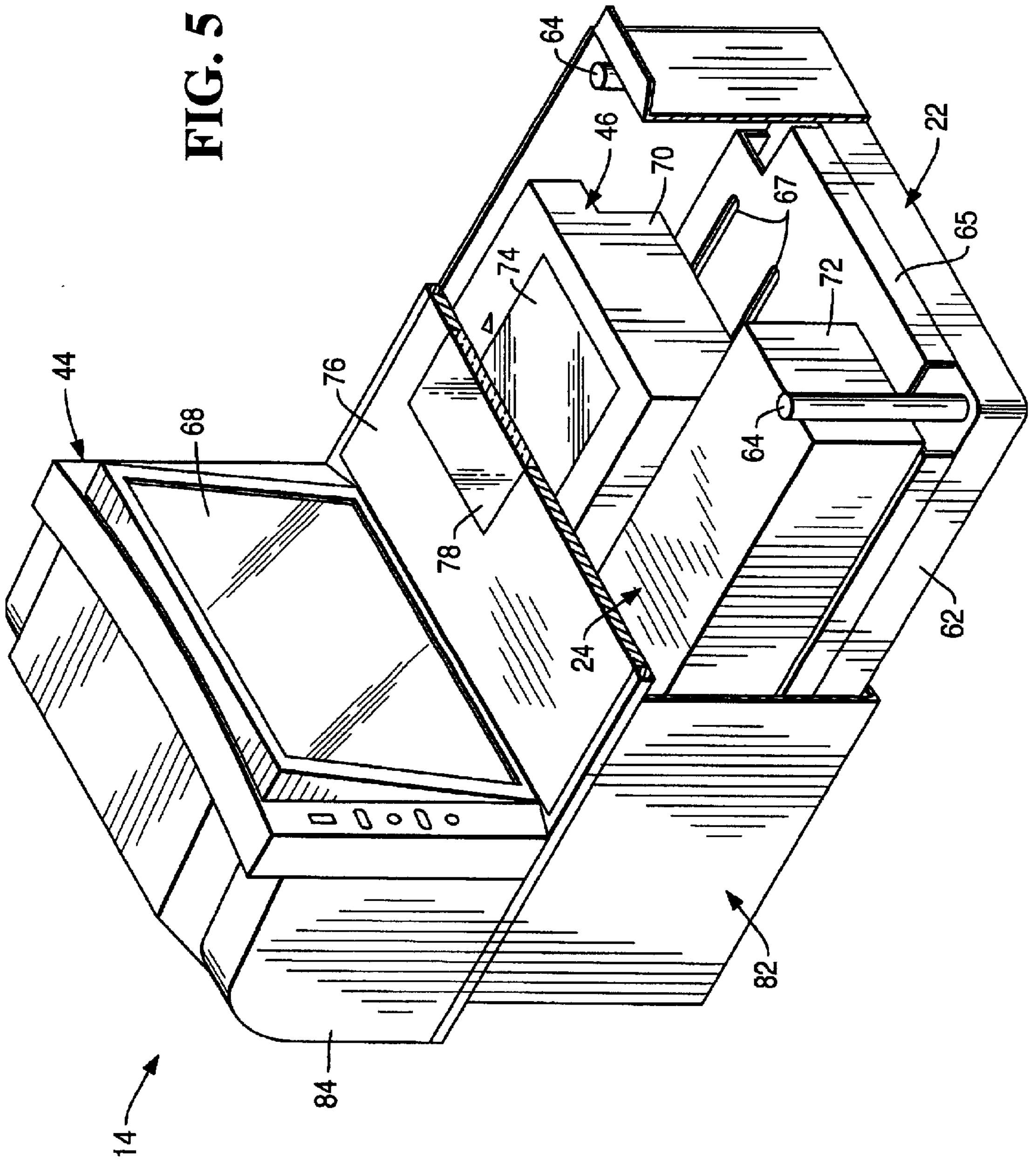
FIGS. 5 and 6 are exterior perspective views of a second embodiment of a checkout device.

Scale also includes a weigh plate which rests on weigh plate supports 64. Different versions of the weigh plate are shown in FIGS. 4 and 5.

An example EAS system 24 includes electromagnetic coil 72. Coil 72 may include separate sense and deactivation coils. Corresponding security labels on products include magnetic material. Coil 72 is packaged into a generally rectangular in shape and positioned adjacent horizontal barcode reader 46. When mounted in a checkout counter, checkout device 14 is preferably oriented so that the length dimension of coil 72 is oriented perpendicular to the direction of product movement (arrow, FIG. 4). In this way, security labels are exposed to the electromagnetic field from coil 72 after their barcode labels are read.

It is a feature of the present invention that horizontal barcode reader 46 and coil 72 may be oriented for left to right or right to left barcode reading. Mounting plate 65 rotates to position horizontal barcode reader 46 and coil 72 on opposite sides, or back to the original positions. During rotation, mounting plate 65 avoids weigh plate supports 64. Mounting plate 65 additional includes fastener holes 67 which allow horizontal barcode reader 46 to slide into correct alignment with window 66 (FIG. 4) and window 78 (FIG. 5). Reversal is completed by horizontally rotating weigh plates 60 and 76. This feature is desirable in checkout stations which must accommodate either types of motion, such as self-service checkout stations.

Also shown are horizontal barcode reader 46 and its window 74.

Turning now to FIG. 4, a first embodiment of checkout device 14 is shown in detail. FIG. 4 illustrates right to left barcode reading. The first embodiment includes the combination of scale 22 and EAS system 24 illustrated in FIG. 3.

Weigh plate 60 includes window 66, which is substantially aligned with window 74 (FIG. 3) of horizontal barcode reader 46. Horizontal barcode reader 46 reads barcode labels on items above weigh plate 60 through window 66.

Vertical barcode reader 44 has its own housing 70, which includes window 68. Housing 70 is placed against scale 22 to form a dual-aperture barcode reader.

Figure 6:
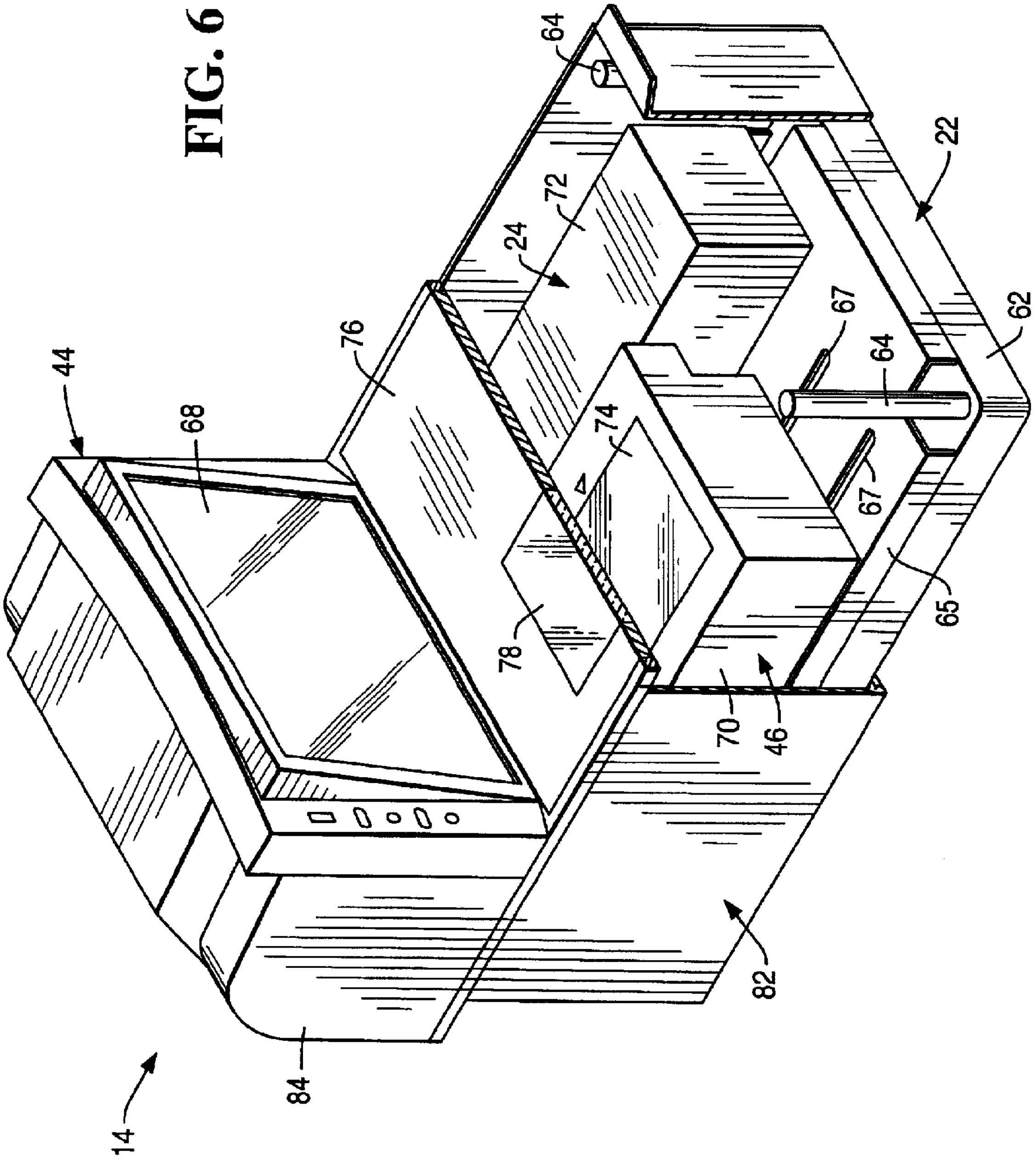

Turning now to FIGS. 5 and 6, a second embodiment of checkout device 14 is shown in detail. FIG. 5 illustrates right to left barcode reading and FIG. 6 illustrates left to right barcode reading.

The second embodiment combines the assembly of FIG. 3 and vertical barcode reader 44 into a common housing 82. Weigh plate 76 rests on weigh plate supports 64 and includes window 78 which is aligned with window 74 of horizontal barcode reader 46.

Housing 82 includes vertical housing portion 84 which contains window 68 of vertical barcode reader 44. The combined assembly forms a dual-aperture barcode reader.

Both embodiments operate in a similar fashion. A product bearing a barcode label and a product security label are moved across weigh plate 60 or 76 with the barcode label within the reading volume formed by light beams emitted from vertical barcode reader 44 and horizontal barcode reader 46. Either or both of vertical barcode reader 44 and horizontal barcode reader 46 read the barcode label. Vertical barcode reader 44 sends an enable signal to interlock 26. Interlock 26 signals EAS system 24 to detect the product security label. Coil 72 senses the magnetic material in the security label. Coil 72 demagnetizes the magnetic material in the security label.

Advantageously, checkout device 14 combines the performance benefits of a dual-aperture barcode reader with electronic article surveillance.

As mentioned above, it is envisioned under the present invention that the roles of vertical barcode reader 44 and horizontal barcode reader 46 may be reversed. Other ways of sharing functions are also envisioned.

In both embodiments, checkout device 14 is preferably about 11.5 inches in width by 20 inches in length. Advantageously, checkout device 14 fits within a "standard" U.S. checkstand hole for combination barcode reader and scale assemblies.

Although the invention has been described with particular reference to certain preferred embodiments thereof, variations and modifications of the present invention can be effected within the spirit and scope of the following claims.

What is claimed is:

1. A checkout device comprising:

a scale including a base portion and a weigh plate over the base portion;

a security label deactivation system between the base portion and the weigh plate; and a barcode reading apparatus including a first barcode reader adjacent the scale having a first aperture and including first video circuitry including a first plurality of video channels; and first decoding circuitry which obtains information from a barcode; and a second barcode reader between the base portion and the weigh plate having a second aperture and including second video circuitry including a second plurality of video channels; and second decoding circuitry which obtains information from the barcode;

wherein the first decoding circuitry decodes first video signals from a first video channel in the first video circuitry and second video signals from a second video channel in the second video circuitry;

wherein the second decoding circuitry decodes third video signals from a third video channel in the first video circuitry and fourth video signals from a fourth video channel in the second video circuitry; and wherein the weigh plate includes a third aperture over the second aperture.

2. A checkout device comprising:

a scale including a base portion and a weigh plate over the base portion; and a barcode reading apparatus including a first barcode reader adjacent the scale having a first aperture and including first video circuitry including a first plurality of video channels; and first decoding circuitry which obtains information from a barcode; and a second barcode reader between the base portion and the weigh plate and having a second aperture and including second video circuitry including a second plurality of video channels; and second decoding circuitry which obtains information from the barcode;

wherein the first decoding circuitry decodes first video signals from a first video channel in the first video circuitry and second video signals from a second video channel in the second video circuitry;

wherein the second decoding circuitry decodes third video signals from a third video channel in the first video circuitry and fourth video signals from a fourth video channel in the second video circuitry; and wherein the weigh plate includes a third aperture over the second aperture.

3. A barcode reading apparatus comprising:

a first barcode reader having a first aperture and including first video circuitry including a first plurality of video channels; and first decoding circuitry which obtains information from a barcode; and a second barcode reader having a second aperture and including second video circuitry including a second plurality of video channels; and second decoding circuitry which obtains information from the barcode;

wherein the first decoding circuitry decodes first video signals from a first video channel in the first video circuitry and second video signals from a second video channel in the second video circuitry; and wherein the second decoding circuitry decodes third video signals from a third video channel in the first video circuitry and fourth video signals from a fourth video channel in the second video circuitry.

* * * * *